(12) United States Patent
Chou

(10) Patent No.: US 7,830,677 B2
(45) Date of Patent: Nov. 9, 2010

(54) SWITCHING POWER CONVERTER CONTROLLED BY A WINDING VOLTAGE SAMPLER

(76) Inventor: Chung Fu Chou, No. 1004, Dawan Rd., Yongkang City, Tainan County 710 (TW)

( * ) Notice: Subject to any disclaimer, the term of this patent is extended or adjusted under 35 U.S.C. 154(b) by 412 days.

(21) Appl. No.: 12/043,379

(22) Filed: Mar. 6, 2008

(65) Prior Publication Data

US 2009/0034301 A1 Feb. 5, 2009

(30) Foreign Application Priority Data

Jul. 30, 2007 (TW) ............................... 96127725 A

(51) Int. Cl.
*H02M 3/335* (2006.01)
(52) U.S. Cl. ................................................. 363/21.12
(58) Field of Classification Search ............. 363/21.12, 363/21.01, 18, 19
See application file for complete search history.

(56) References Cited

U.S. PATENT DOCUMENTS

| | | | |
|---|---|---|---|
| 6,958,920 B2 * | 10/2005 | Mednik et al. | 363/19 |
| 6,967,851 B2 * | 11/2005 | Yang et al. | 363/16 |
| 7,161,815 B2 * | 1/2007 | Mori | 363/21.12 |
| 7,505,287 B1 * | 3/2009 | Kesterson | 363/21.01 |
| 7,635,956 B2 * | 12/2009 | Huynh et al. | 315/291 |

\* cited by examiner

*Primary Examiner*—Adolf Berahne
*Assistant Examiner*—Emily Pham

(57) ABSTRACT

This invention discloses a switching power converter controlled by a winding voltage sampler, including an input circuit with an input end, an output circuit with an output end, one or more switches, a controller to regulate on/off of the switch, a winding voltage sampler, and a transformer including a primary-side coil assembly connecting the switch and the winding voltage sampler, and a secondary-side coil assembly. The output circuit connects the secondary-side coil assembly; the winding voltage sampler detects preset reference voltage of the primary-side coil assembly for the controller to regulate output voltage.

13 Claims, 11 Drawing Sheets

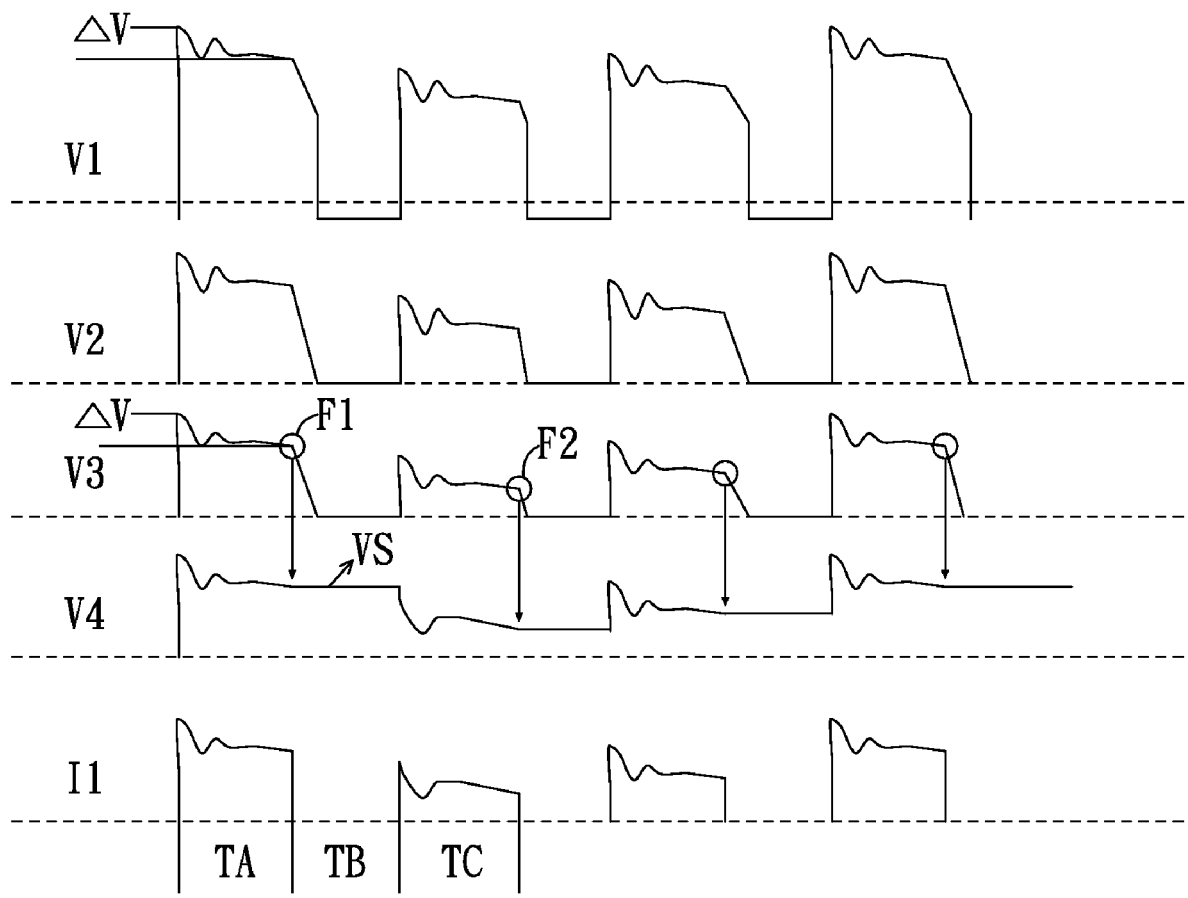
F I G . 4

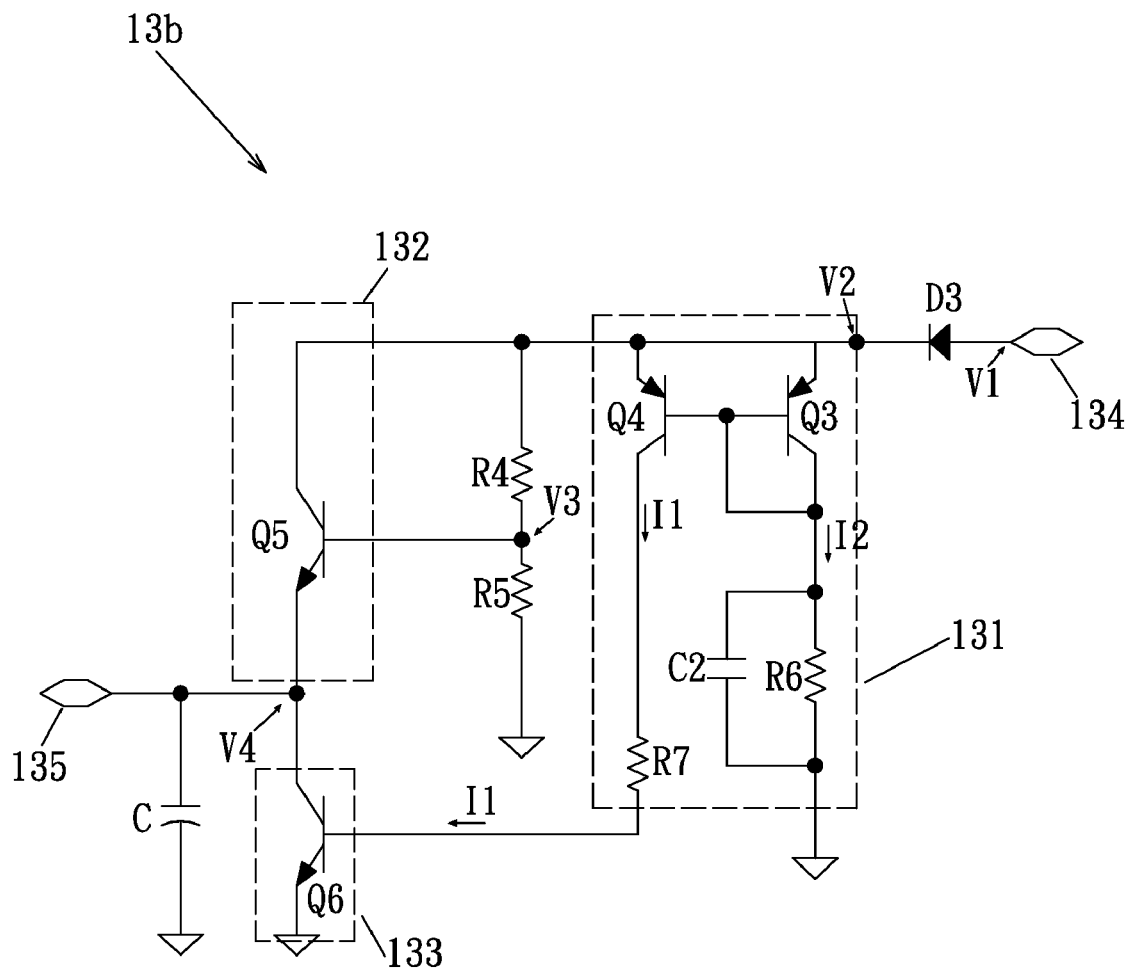
F I G .5

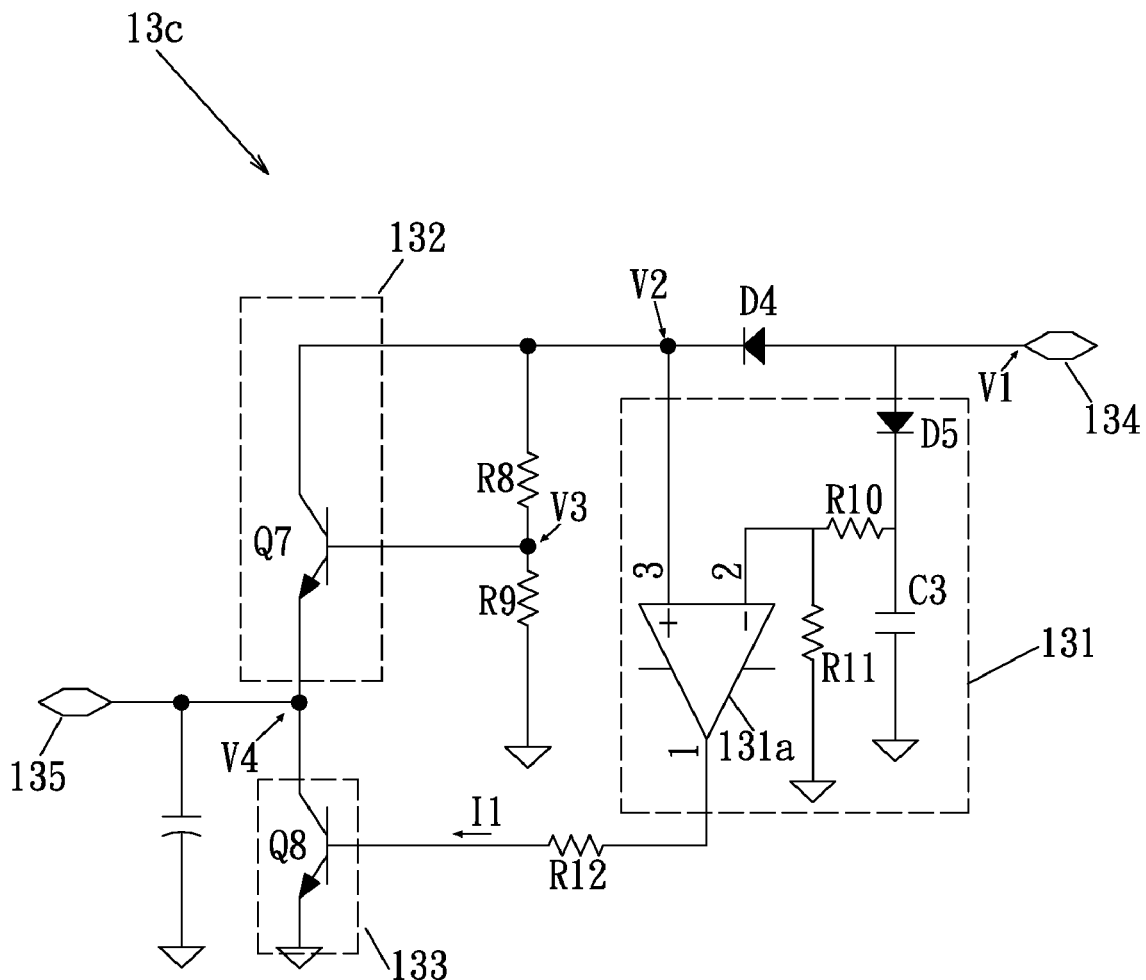
F I G . 7

US 7,830,677 B2

SWITCHING POWER CONVERTER CONTROLLED BY A WINDING VOLTAGE SAMPLER

BACKGROUND OF THE INVENTION

1. Field of the Invention

The invention relates to a switching power converter and more particularly, to a switching power converter that applies a winding voltage sampler in the primary-side coil assembly of a transformer to regulate the on/off state of a switching device in the primary-side coil assembly based on deviation of the sampled voltage from a pre-set reference voltage.

2. Description of the Prior Art

Switching power converters have the advantages of high working efficiency and limited volume in size, and therefore, are widely used in a variety of electronic devices. FIG. 9 shows the circuit of a conventional flyback converter, including mainly an input circuit 1', an output circuit 2', a transformer T1', and an optical coupler 3'.

Still referring to FIG. 9, the input circuit 1' connects to an input voltage Vin and includes two main parts, a transistor Q1' for switching, and, a controller 11' for regulating PWM (Pulse Width Modulation). The transistor Q1' connects to the primary-side coil assembly of the transformer T1' at one end, and also connects to the output end of the controller 11' with a PWM control at the other end. The input end FB of the controller 11' connects to one end of the optical coupler 3'.

At the output end (indicated by a dotted rectangle on the right in FIG. 9) an output circuit 2' connects to a secondary-side coil assembly of a transformer T1'. The output voltage Vout connects in parallel to one end of optical coupler 3', making input circuit 1' being segregated from output circuit 2', and conveying output voltage Vout as a feedback to controller 11' (of input circuit 1'). Consequently, controller 11' is able to output a more stabilized voltage in correspondence to the feedback voltage by regulating the on/off states of transistor TI'.

To sum up, the above-mentioned prior art (illustrated in FIG. 9) makes use of the feedback control function of an optical coupler to manage stability of output voltages; the physical characteristics of an optical coupler unavoidably affects stability and durability of the system. For instance, the coupling efficiency of an optical coupler reflects the accuracy of an output voltage. Furthermore, extra electric elements are required to avoid or reduce the unstable performance of an optical coupler when it is used as a current-stabilizing current charger, adding more cost and bringing in undesired idleness and worn-out to the system.

FIG. 10 illustrates the electric circuits of another conventional flyback converter, including mainly an input circuit 5' (indicated by a dotted rectangle on the left), a transformer T2', an output circuit 6' (as indicated by a dotted rectangle on the right). Unlike a conventional converter shown in FIG. 9, the transformer T2' (shown in FIG. 12) includes three coils: two coils on the primary-side coil assembly (i.e. a primary-side 1$^{st}$ coil assembly, and a primary-side 2$^{nd}$ coil assembly) and one on the secondary-side coil assembly (i.e. a secondary-side 3$^{rd}$ coil assembly).

The input circuit 5' connected to an input voltage Vin and includes two main parts: a transistor Q2' for switching, and a controller 51' for regulating PWM. One end of the transistor Q2' connects to the primary-side 1$^{st}$ coil assembly N1' (of the transformer T2'), and the other end, to the output end of the controller 51'. The input end of the controller 51' connects to the primary-side 2$^{nd}$ coil assembly N2' (of transformer T2').

At the output end (indicated by a dotted rectangle on the right of FIG. 10), the output circuit 6' connects to the secondary-side 3$^{rd}$ assembly N3' (of transformer T2') with an output voltage Vout. Deviations or variations in voltage conveyed from secondary-side coil assembly (of transistor T2') to primary-side coil assembly (of transformer T2') are detected by controller 51'. Controller 51' regulates output voltages Vout by controlling the switching on/off of transistor Q2' according to voltage deviations detected.

The above-mentioned conventional circuit has the merit of simplicity in structure, which, nevertheless, relies completely upon the physical characteristics of transformer T2' for detecting changes in voltage and for regulating the circuit accordingly. Furthermore, the voltage conveyed back is not continuous in nature, affecting adversely system stability and durability, the no-load output voltage, and efficiency of dynamic voltage management.

SUMMARY OF THE INVENTION

The purpose of the invention is to control the on/off states of a switch in the primary-side coil assembly for higher reliability and precision in output voltage by means of a winding voltage sampler in the primary-side coil assembly of a transformer.

BRIEF DESCRIPTION OF THE DRAWINGS

FIG. 4 is an illustration of wave forms of the 1$^{st}$ winding voltage sampler corresponding to Fig.

FIG. 5 illustratrates the electrical configuratin of a 2$^{nd}$ winding voltage sampler of the 1$^{st}$ embodiment of this invention.

FIG. 7 illustratrates the electrical configuratin of a 3rd winding voltage sampler of the 1$^{st}$ embodiment of this invention.

DETAILED DESCRIPTION OF THE PREFERRED EMBODIMENT

Figure 1:
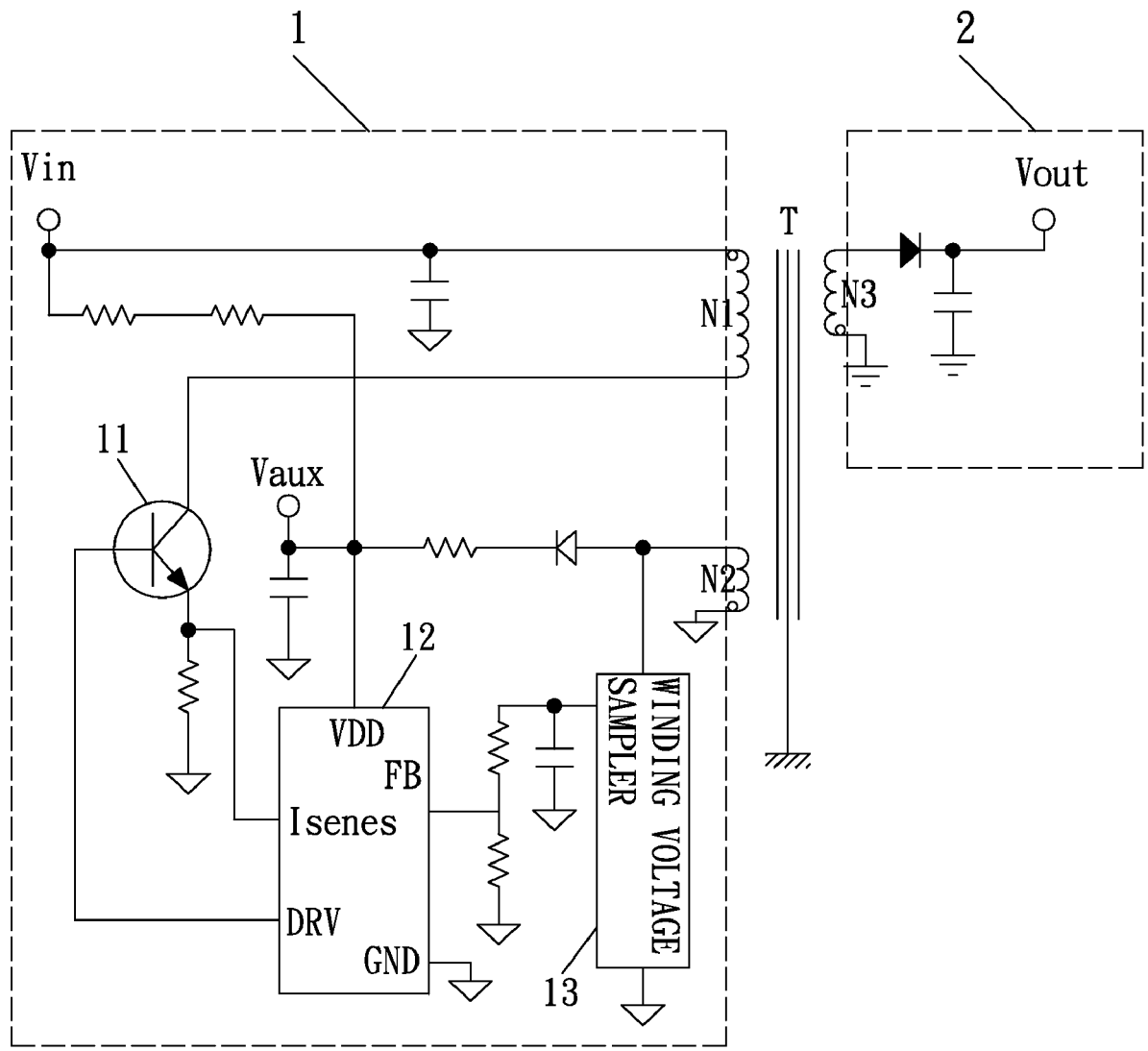
FIG. 1 is an illustration of the basic circuit structure of the 1$^{st}$ embodiment of this invention.

Referring to FIG. 1, the invention includes mainly an input circuit 1, a transformer T, and an output circuit 2. The input circuit 1 includes an input end Vin, a controller 12, and a switch 11. Controller 12 regulates activity of switch 11 and PWM. Switch 11 can be implemented as a transistor, a MOSFET, a single switch or a combination of switching devices. Controller 12 connects at its output end to switch 11 and includes a winding voltage sampler 13; winding voltage sampler 13 connects to coil assembly N2 of transformer T and outputs sampled voltages to the input end FB of controller 12.

The transformer T includes two primary-side coil assemblys, N1 and N2, and a secondary-side coil assembly, N3. The primary-side coil assembly N1 (of the transformer T) connects to the switching device 11 (of the input circuit 1), while N2 (of the transformer T) connects to the winding voltage sampler 13.

The output circuit 3 includes an ouput end Vout and connects to the secondary-side coil assembly N3 (of the transformer).

Figure 2:
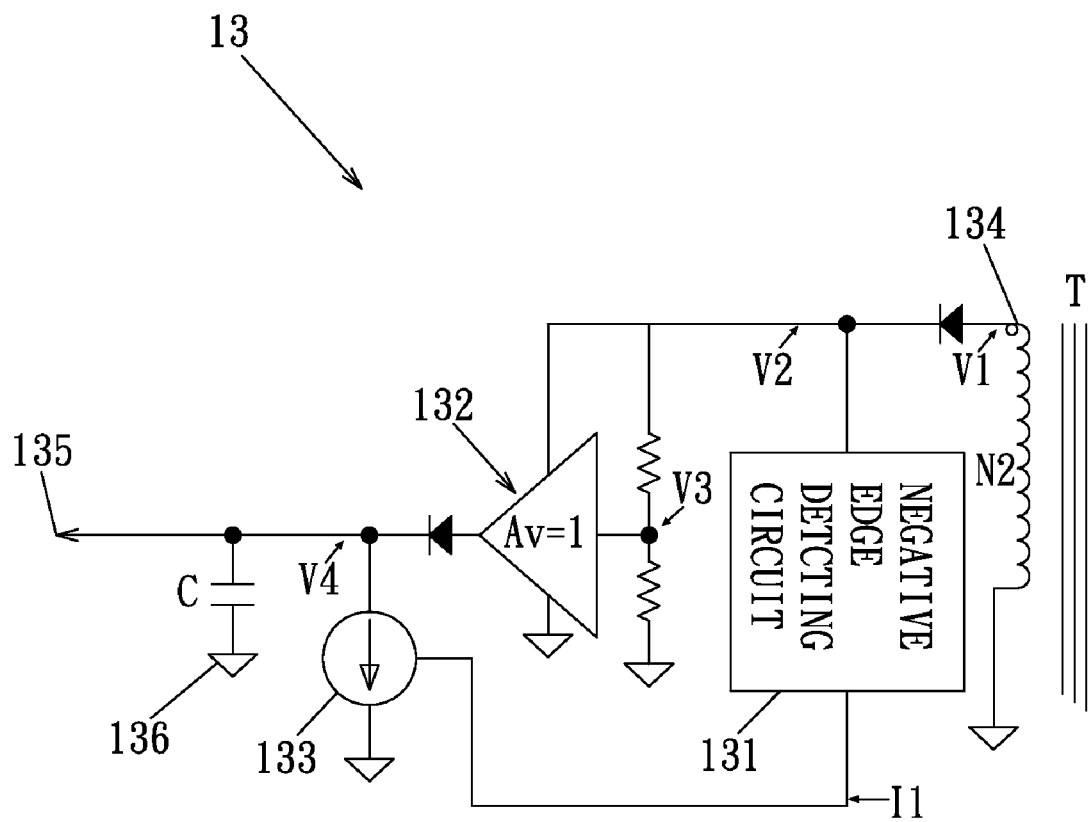
FIG. 2 is an illustration of a winding voltage sampler of the 1$^{st}$ embodiment of this invention.

Referring to FIG. 2, a winding voltage sampler 13 of a preferred embodiment of the invention includes a negative edge detecting circuit 131, a voltage-coupler circuit 132, a current source control circuit 133, a voltage stabilizing capacitor C, an input end 134, an output end 135, and a ground 136. The input end of the negative edge detecting circuit 131 includes a rectifier diode and connects to the input end 134. The input end 134 also connects to N2 (of the primary-side coil assembly of transformer T). The output end of the negative edge detecting circuit 131 connects to the current source control circuit 133. The voltage-coupler circuit 132 has a gain AV equal to 1, and the input side of the voltage-coupler circuit 132 connects to the primary-side coil assembly N2 (of transformer T). The output side of the voltage-coupler circuit 132 connects to the current source control circuit 133, the stabilizing capacitor C, and the output end 135 of the system. The voltage-coupler circuit 132 further connects to a voltage-divider resistor to channel in divided voltages. The current source control circuit 133 connects to the voltage-coupler circuit 132, to the output side of the negative edge detecting circuit 131, and to the output end 135. The stabilizing capacitor C also connects to the output end 135.

Figure 3:
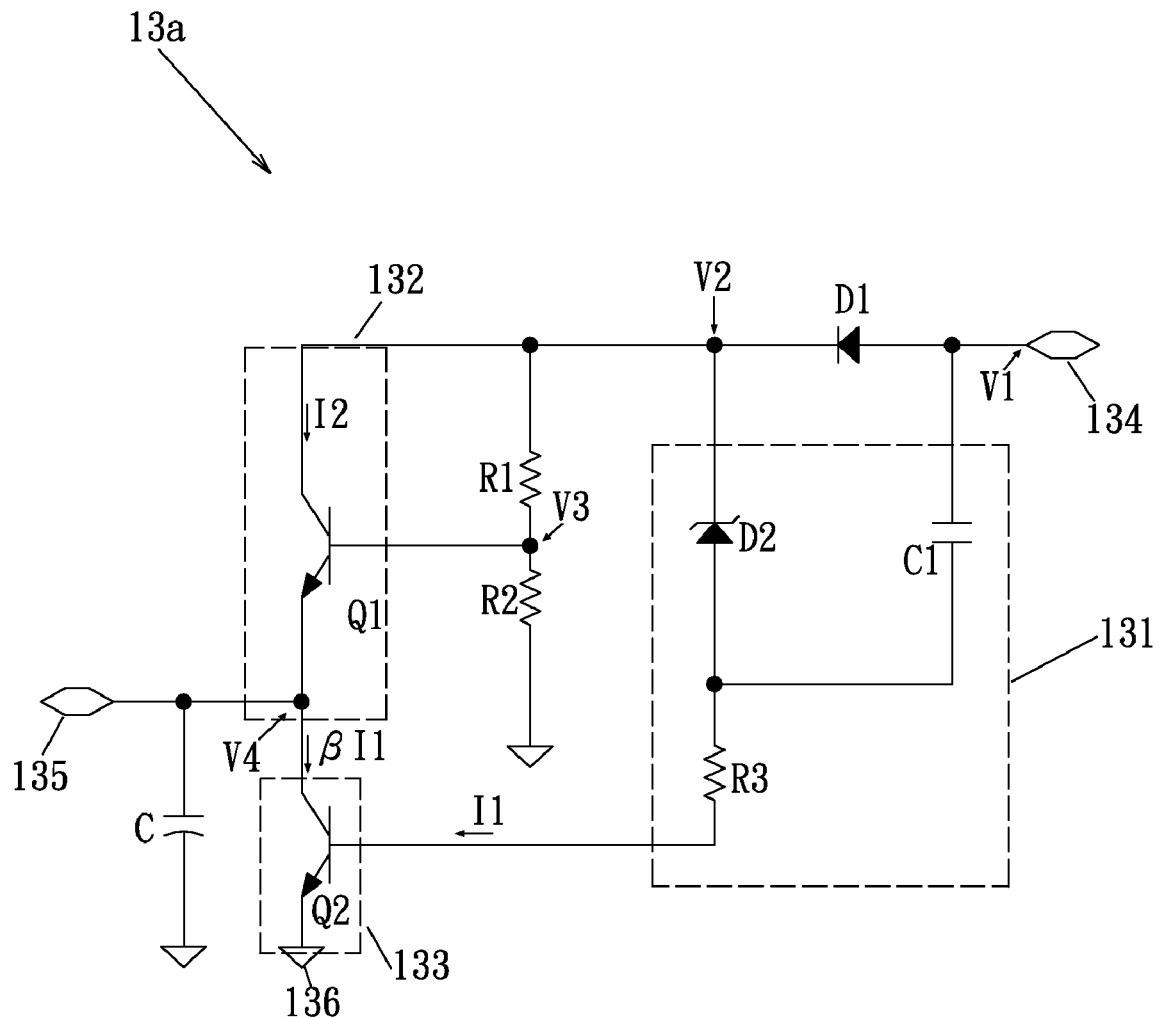
FIG. 3 illustratrates the electrical configuratin of a 1$^{st}$ winding voltage sampler of the 1$^{st}$ embodiment of this invention.

The negative edge detecting circuit 131 of the winding voltage sampler 13 in this invention can be implemented as different circuit configurations with the same or similar function. FIG. 3 shows the electric circuits of the $1^{st}$ winding voltage sampler 13a of this invention, the rectifier diode D1 connects to the input end 134; the $1^{st}$ voltage-divider resistor R1 and the $2^{nd}$ voltage-divider resistor R2 connects to the voltage-coupler circuit 132; the $1^{st}$ voltage-divider resistor R1 further connects to the rectifier diode D1. The negative edge detecting circuit 131 includes a Zener diode D2, a $1^{st}$ capacitor C1, and a $3^{rd}$ resistor R3. One end of the Zener diode D2 connects to the rectifier diode D1, and the other end, to the $3^{rd}$ resistor R3. The $3^{rd}$ resistor R3 connects to the current source control circuit 133; two ends of the $1^{st}$ capacitor C1 connects to the output end 134 and the $3^{rd}$ resistor R3, respectively. The voltage-coupler circuit 132 includes a $1^{st}$ transistor Q1 with terminal C connects to the rectifier diode D1, with terminal B connects to the voltage-divider resistor R1 and R2 at the voltage-dividing point, and with terminal E connects to the current source control circuit 133 and to the output end 135. The current source control circuit 133 includes a $2^{nd}$ transistor Q2 with terminal C connected to terminal E of the $1^{st}$ transistor Q1 and to the output end 135, terminal B connects to the $3^{rd}$ resistor R3 of the negative edge detecting circuit 131, and terminal E grounded. The positive end of the stabilizing capacitor C connects to the output end 135.

Referring to FIG. 1 to 4, the input end 134 of the $1^{st}$ winding voltage sampler 13a feedbacks winding voltage V1 to the primary-side coil assembly of transformer T, and at time TA (i.e. when switch 11 is off) the winding voltage V1 is divided by resistors R1 and R2, resulting in a divided voltage V3 turning on transistor Q1 and charging the stabilizing capacitor C. V3 follows V1, while V1 turns on the transistor Q2 with a current I1 through rectifier diode D1, Zener diode D2, and resistor R3. The winding voltage V1 also charges $1^{st}$ capacitor C1. The current I2 that flows through transistor Q1 is a lot more than the current I1. The voltage of the Zener diode D2 and the impedance of the resistor R3 are determined and set up in accordance with the output voltage Vout of output circuit 2.

Referring to FIG. 4, at time TB, the winding voltage V1 (sent as a feedback) drops substantially with a negative edge F1 voltage, which stops the winding current from flowing through Zener diode D2 and capacitor C1, which would make Q2 inactive and current I1 zero; current in stabilizing capacitor C would not discharge from transistor Q2; the dropping winding voltage V1 cuts off the transistors Q1 and Q2, but the output end 135 still has the straight-line DC voltage of stabilizing capacitor C (shown as VS in FIG. 4), allowing reference voltage (that is input into the controller 12) to react in correspondence to negative edge F1 voltage for controller 12 to regulate output voltage Vout (of output circuit 2) based upon the reference voltage.

The above-discussed negative edge F1 voltage as a reference voltage occurs when the smallest current flows in the electric system of the converter, and when the parasitic resistance has the smallest voltage drop, making negative edge F1 voltage a reliable reference for controller 12 and also avoiding the effect of voltage differences ΔV (resulting from leakage inductance of transformer T) on the fedback winding voltage V1.

At the next time point TC, if the fedback voltage V1 drops and causes voltage V3 to drop, since the stored voltage VS of stabilizing capacitor C at the previous time point is greater than V3, transistor Q1 will not turn on, while transistor Q2 will turn on with winding voltage V1 by both capacitor C1 and resistor R3, discharging voltage V4 of stabilizing capacitor C via transistor Q2 until voltage V4 is less than voltage V3 minus voltage VBE of transistor Q1 for Q1 to turn on; current I2 will charge stabilizing capacitor C, with the output voltage V4 being determined by transistor Q1, and V4 follows voltage V3 and winding voltage V1; when negative edge F2 occurs, transistor Q2 is cut off, and voltage V4 is input to controller 12 with V4 corresponding to the negative edge voltage at this specific time point. As a result, controller 12 is able to generate a more reliable output voltage (of output circuit 2) at any time point by regulating the on/off of switch I1 in reference to negative edge voltage.

Referring to FIG. 5, the $2^{nd}$ winding voltage sampler 13b in the invention differs from the $1^{st}$ winding voltage sampler 13a in the negative edge detecting circuit 131. The $2^{nd}$ winding voltage sampler 13b includes a rectifier diode D3 connecting an input end 134, and the $4^{th}$ and $5^{th}$ voltage-divider resistors R4 and R5 connecting voltage-coupler circuit 132. The negative edge detecting circuit 131 includes a $3^{rd}$ transistor Q3, a $4^{th}$ transistor Q4, a $6^{th}$ resistor R6, a $7^{th}$ resisitor R7, and a $2^{nd}$ capacitor C2. Terminal E of transistor Q3 and Q4 connects to rectifier diode D3; terminal B of Q3 and Q4 connects to each other; terminal C of Q3 and Q4 connects in series to resistor R6 and R7, respectively, to form a mirror current circuit. Resistor R6 connects in parallel to capacitor C2; resistor R7 connects to current source control circuit 133. The voltage-coupler circuit 132 includes a transistor Q5 with terminal C connecting rectifier diode D3, terminals B connecting resistors R4 and R5, and terminals E connecting to current source control circuit 133 and to the output end 135; current source control circuit 133 includes a transistor Q6 with terminal C of Q6 connecting to terminal E of Q5 and to output end 135, terminal B of Q6 connecting resistor Q7, and terminal E connecting ground. The positive end of stabilizing capacitor C connects output end 135.

Referring to FIGS. 4 and 5, when winding voltage sampler 13b is active, at time TA the winding voltage V1 turns on transistor Q5 (of voltage coupler circuit 132), voltage V3 then follows voltage V1, and charges stabilizing capacitor C to voltage V4; while winding voltage V1 triggers transistor Q3 and Q4 with current I2 and I1, and also triggers transistor Q6 (of current source control circuit 133). Current I2 also charges capacitor C2.

Figure 6:
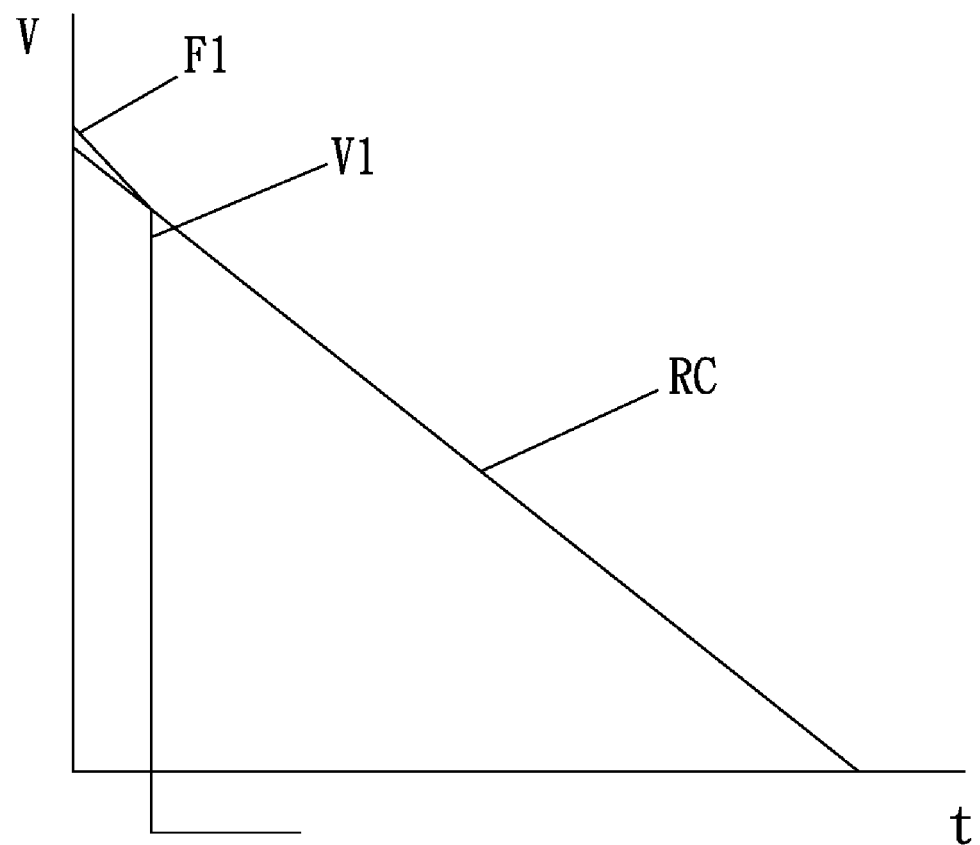
FIG. 6 illustrates the winding voltage V1 vs. RC discharge along the time line for the 2$^{nd}$ winding voltage sampler of the 1$^{st}$ embodiment of this invention.

When negative edge F1 occurs, at time TB the winding voltage V1 drops rapidly until V1 is less than the voltage in capacitor C2 to cut off transistor Q3, Q4 and Q6, and to maintain a voltage V4 for stabilizing capacitor C. In the mean time, capacitor C2 discharges via resistor R6. As shown in FIG. 6. At time TB, transistor Q6 is not triggered (or turned on) since RC discharging period of capacitor C2 is longer than the time period for wiindingl voltage V1 to drop from negative edge F1 to a low current; transistor Q6 at time TB is therefore not turned on. Voltage VS in DC status is maintained at the output end 135 and conveyed to controller 12 for controller 12 to react to a rather reliable negative edge reference voltage.

At time TC, winding voltage V1 will again trigger transistor Q6 and allow capacitor C to store negative edge F2 voltage as a reference for the next time point.

Referring to FIG. 7, the $3^{rd}$ winding voltage sampler 13C includes another negative edge detecting circuit with a rectifier diode D4 connecting an input end 134, voltage-divider resistors R8 and R9 connecting a voltage coupler circuit 132; negative edge detecting circuit 131 includes a comparator 131a, a rectifier diode D5, resistors R10, R11, and R12, and a $3^{rd}$ capacitor C3. The positive and negative end of the comparator 131a connects in series to rectifier diodes D4 and D5, respectively. Rectifier diode D5 connects to input end 134, and connects in series to a $3^{rd}$ capacitor C3 and to ground. In between the negative input end of the comparator 131a and rectifier diode D5 is connected in series a $10^{th}$ resistor R10. One end of resistor R10 connects capacitor C3, and the other end of R10 connects resistor R11 and ground, making the connection of R10 and R11 discharging path for capacitor C3. The output end of comparator 131a connects resistor R12 and current source control circuit 133. Voltage coupler circuit 132 includes resistor Q7 with terminal C connecting rectifier diode D4, terminal B connecting voltage divider resistors R8 and R9, and terminal E connecting current source control circuit 133 and an output end 135. Current source control circuit 133 includes a transistor Q8 with terminal C connecting terminal E of transistor Q7 and output end 135, terminal B connecting resistor R12 and terminal E connecting ground. The positive input end of stabilizing capacitor C connects to output end 135.

Referring to FIGS. 4 and 7, when the $3^{rd}$ winding voltage sampler 13C is active, at time TA, winding voltage V1 will trigger transistor Q7 and charge capacitor C. Winding voltage V1 charges capacitor C3 via diode D5; voltage coming to the negative input end of comparator 131a includes voltage divided between resistors R10 and R11, making voltage at the negative input end of comparator 131a being less than voltage at the positive input end so that comparator 131a is able to output a positive voltage to trigger transistor Q8.

At time TB, when negative edge F1 occurs, voltage at negative edge F1 drops rapidly and hence is lower than voltage at capacitor C, with transistor Q8 being cut off and negative edge F1 voltage detected. In the meantime, capacitor C discharges via resistors R10 and R11. Similar to the $2^{nd}$ winding voltage sampler 13b discussed previously, since discharging time of capacitor C is greater than the time period for winding voltage to drop from negative edge F1 to a low voltage, voltage is maintained in a DC state at the output end 135 for controller 12 to react accordingly.

The winding voltage sampler 13 can be implemented as a circuit with three pins, including an input end, an output end, and a ground pin when produced in large quantity and when positioned within the converter.

Figure 8:
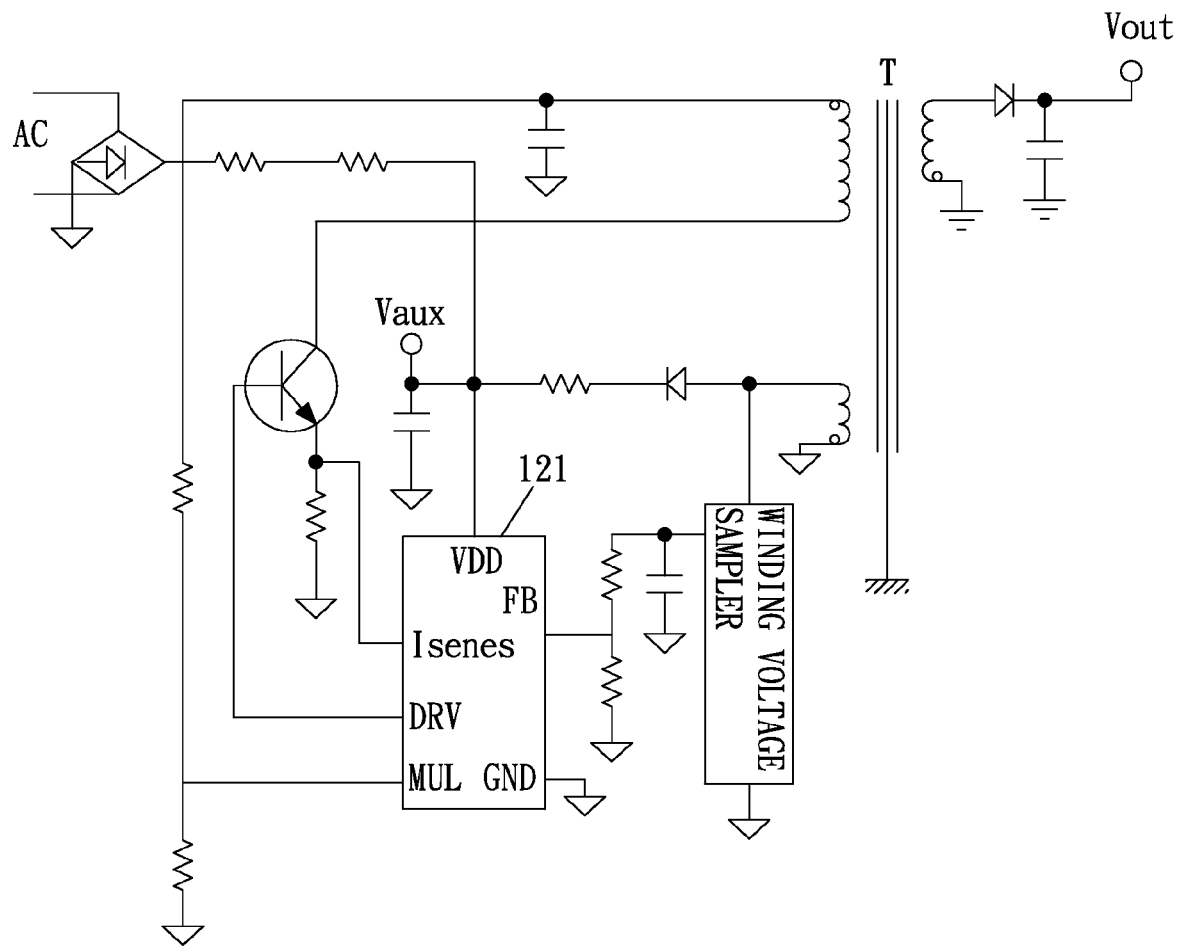
FIG. 8 is an illustration of the circuit configuration of the 1$^{st}$ embodiment of this invention.
Figure 9:
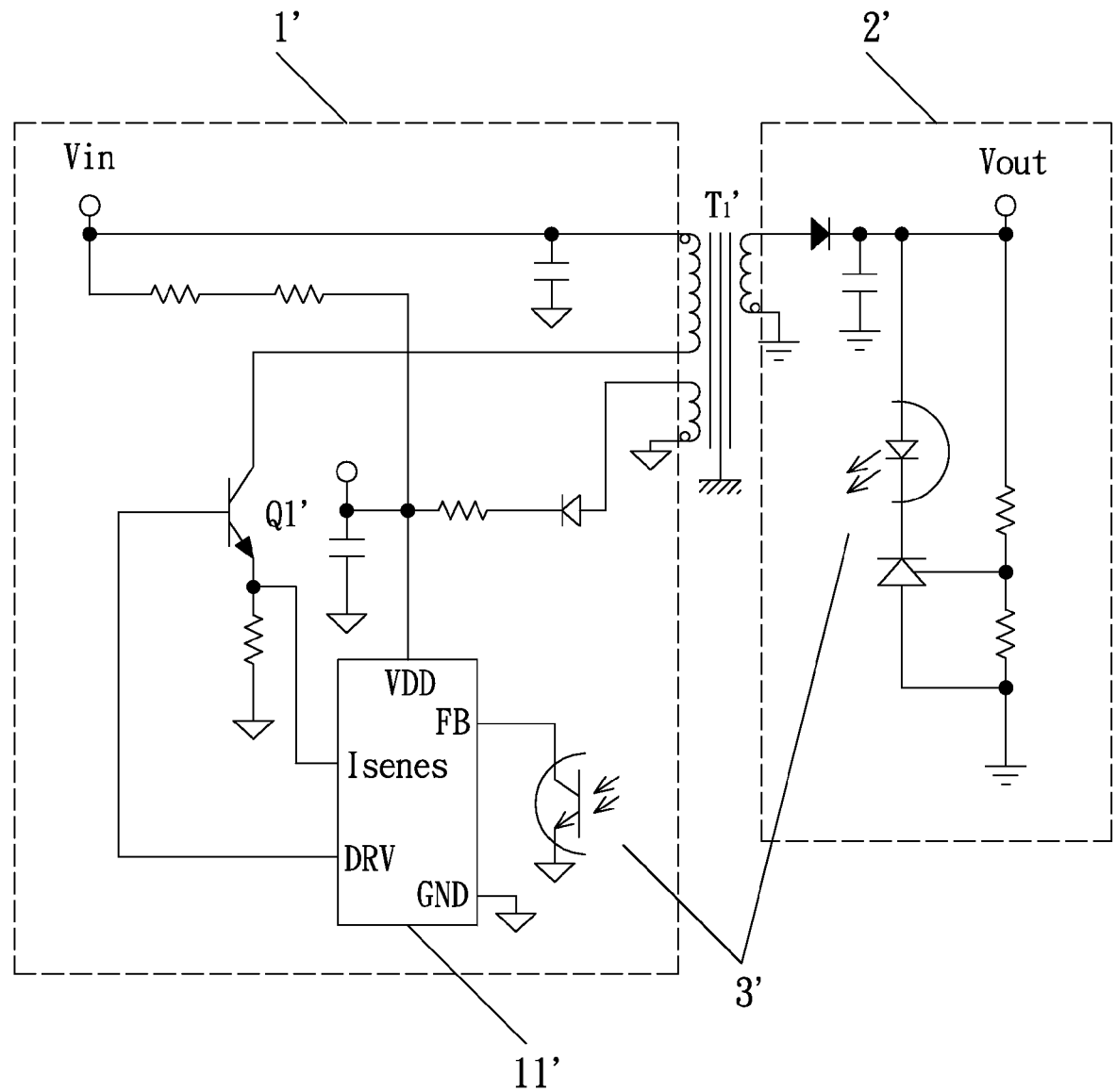
FIG. 9 is an illustration of a conventional flyback converter.
Figure 10:
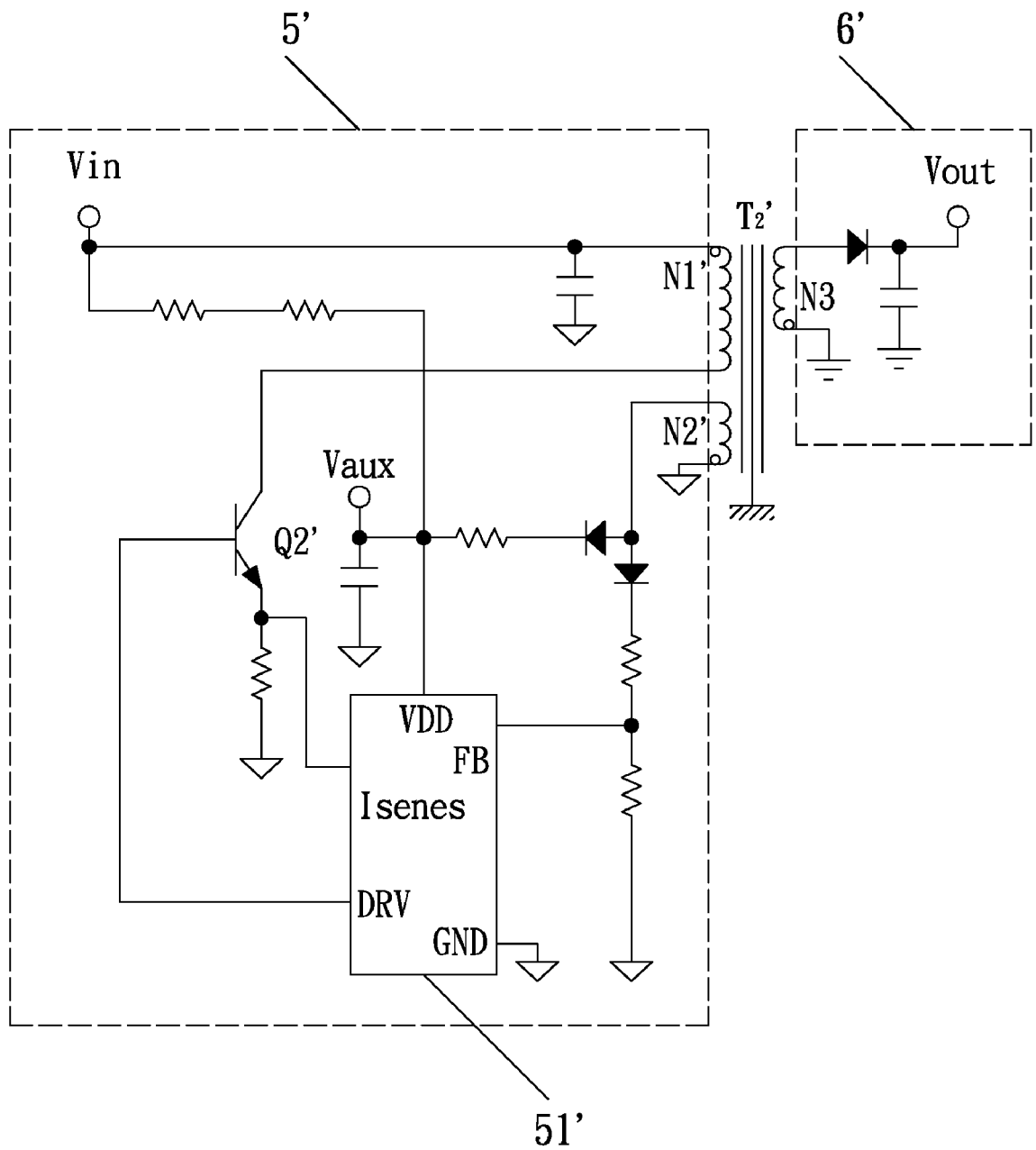
FIG. 10 is an illustration of a second conventional flyback converter.
Figure 11:
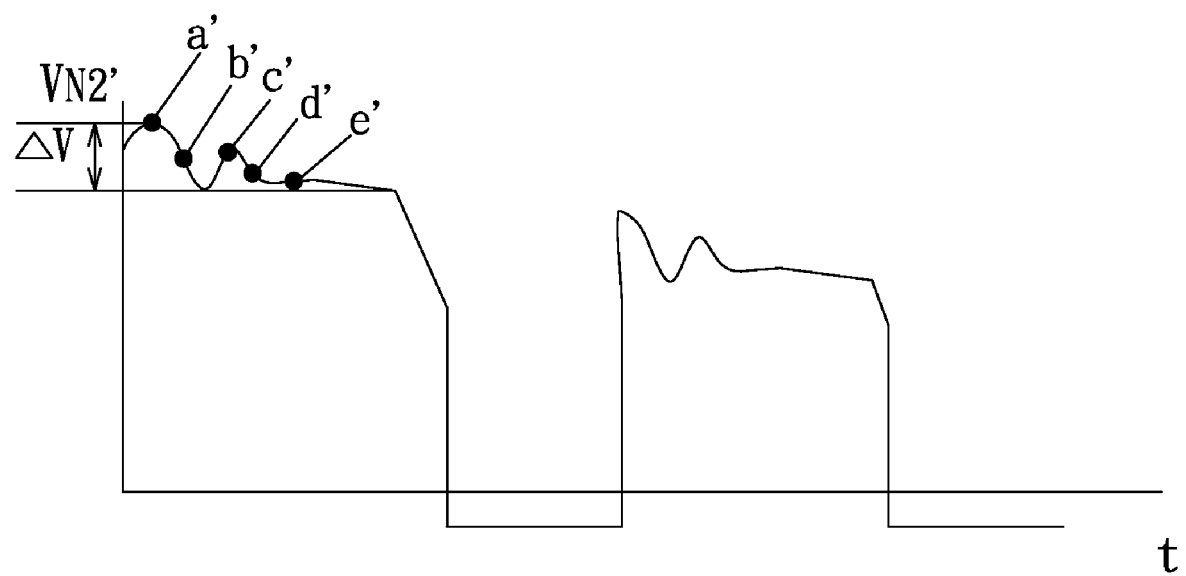
FIG. 11 is an illustration of voltage waveforms of primary-side coil assembly and sampled voltages of a second conventional flyback converter shown in FIG. 10.

Referring to FIG. 8, the $1^{st}$ embodiment of the invention provides a reference voltage for a PWM controller, and the $2^{nd}$ embodiment provides a single level isolating PFC converter for inputing negative edge reference voltage into a PFC controller.

Although two preferred embodiments in accordance with the present invention have been provided in this application, it is to be understood that many other possible modification and variations can be made without departing from the scope of the present invention hereafter claimed.

I claim:

1. A switching power converter controlled by a winding voltage sampler, including
    an input circuit with an input end, at least one switch, a controller to regulate on/off of said switch, and a winding voltage sampler;
    a transformer, including a primary-side coil assembly connecting said switch and said winding voltage sampler, and a secondary-side coil assembly;
    an output circuit with an output end, wherein said output circuit connects said secondary-side coil assembly,
    wherein said winding voltage sampler detects a preset reference voltage and a rapid dropping negative edge voltage of said primary-side coil assembly of said transformer for said controller to react to, and
    said winding voltage sampler further includes a negative edge detecting circuit, a voltage coupler circuit, a current source control circuit, a stabilizing capacitor, and a system input, a system output and a system ground point.

2. The switching power converter controlled by a winding voltage sampler as claimed in claim 1, wherein the input end of said negative edge detecting circuit connects said system input, which in turn connects said primary-side coil assembly, the output end of said negative edge detecting circuit connects said current source control circuit;
    the input end of said voltage coupler circuit connects said primary-side coil assembly of said transformer, while the output end connects said current source control circuit, said stabilizing capacitor, and said system output with a voltage of said primary-side coil assembly of said transformer;
    said current source control circuit connects said voltage coupler circuit, said output end of said negative edge detecting circuit, and said system output; and
    said stabilizing capacitor connects said system output.

3. The switching power converter controlled by a winding voltage sampler as claimed in claim 2, wherein a rectifier diode is positioned in between said input end of said negative edge detecting circuit and said system output;
    said voltage coupler circuit connects a voltage-divider resistor and includes a transistor with terminal C connects a diode, terminal B connects said voltage-divider resistor, and terminal E connects to said current source control circuit and to said system output;
    said current source control circuit includes a transistor with terminal C connects to terminal E of said transistor in said voltage coupler circuit and to said system output, terminal B connects said negative edge detecting circuit, and terminal E grounds; and
    the positive end of said stabilizing capacitor connects said system output.

4. The switching power converter controlled by a winding voltage sampler as claimed in claim 1, wherein said winding voltage sampler is an itegrated circuit with three pins, the coming-in pin, the going-out pin, and the ground pin.

5. The switching power converter controlled by a winding voltage sampler as claimed in claim 3, wherein said negative edge detecting circuit includes a Zener diode, a negative edge capacitor, and a negative edge resistor; one end of said Zener diode connects said rectifier diode, and the other end connects said negative edge resistor which in turn connects said current source control circuit; and the two ends of said negative edge capacitor connect said system input and said negative edge resistor, respectively.

6. The switching power converter controlled by a winding voltage sampler as claimed in claim 3, wherein said negative edge detecting circuit includes a current minor circuit.

7. The switching power converter controlled by a winding voltage sampler as claimed in claim 6, wherein said negative edge detecting circuit includes a $3^{rd}$ and a $4^{th}$ transistors, a $6^{th}$ and $7^{th}$ resistors, and a $2^{nd}$ capacitor;
  terminal E of said $3^{rd}$ and $4^{th}$ transistors connect said rectifier diode, two terminals B of said $3^{rd}$ and 4.sup.th transistors connect to each other, and two terminals C connects in series to said $6^{th}$ and $7^{th}$ resistors, respectively, forming a current mirror circuit; and
  said $6^{th}$ resistor connects in parallel to said $2^{nd}$ capacitor, and said $7^{th}$ resistor connects current source control circuit.

8. The switching power converter controlled by a winding voltage sampler as claimed in claim 7, wherein the time period for said $2^{nd}$ capacitor to discharge is longer than that for winding voltage to drop from negative edge voltage to a low value.

9. The switching power converter controlled by a winding voltage sampler as claimed in claim 3, wherein said negative edge detecting circuit includes a comparator with a positive input end, a negative input end, and an output end.

10. The switching power converter controlled by a winding voltage sampler as claimed in claim 9, wherein said negative edge detecting circuit further includes two negative edge rectifier diodes D1 and D2, two voltage-divider resistors R8 and R9 connecting said voltage coupler circuit, a $10^{th}$, a $11^{th}$, and a $12^{th}$ resistor, and a $3^{rd}$ capacitor;
  said positive input end and said negative input end of said comparator connects in series to said two negative-edge rectifier diodes D1 and D2, respectively;
  said negative-edge rectifier diode D1 connects said system input, and said negative-edge rectifier diode D2 connects in series to said $3^{rd}$ capacitor and grounds;
  in between said negative-edge rectifier diode D2 and said negative input and of said comparator is connected in series a $10^{th}$ resistor;
  one end of said $10^{th}$ resistor connects one end of said $3^{rd}$ capacitor and said $11^{th}$ resistor before grounding, making a discharge path by said $10^{th}$ and said $11^{th}$ resistor for said $3^{rd}$ capacitor; and
  said output end of said comparator connects to said $12^{th}$ resistor and to said current source control circuit.

11. The switching power converter controlled by a winding voltage sampler as claimed in claim 10, wherein the time period for said $3^{rd}$ capacitor to discharge is longer than that for winding voltage to drop from negative edge voltage to a low value.

12. The switching power converter controlled by a winding voltage sampler as claimed in claim 1, wherein said controller of said input circuit is a PWM controller.

13. The switching power converter controlled by a winding voltage sampler as claimed in claim 1, wherein said controller of said input circuit is a PFC controller.

* * * * *